United States Patent [19]

Baniel

[11] Patent Number: 4,517,142

[45] Date of Patent: May 14, 1985

[54] METHOD FOR PRODUCING PERMEABLE POLYMERIC MEMBRANES

[75] Inventor: Avraham M. Baniel, Jerusalem, Israel

[73] Assignee: Yissum Research Development Company of the Hebrew University of Jerusalem, Jerusalem, Israel

[21] Appl. No.: 290,604

[22] Filed: Aug. 6, 1981

[30] Foreign Application Priority Data

Aug. 20, 1980 [IL] Israel .................................. 60886

[51] Int. Cl.$^3$ .............................................. B29D 27/00
[52] U.S. Cl. ..................................... 264/22; 210/500.2; 264/41; 264/49; 264/54; 264/DIG. 5; 264/DIG. 18; 521/61
[58] Field of Search ................. 264/54, 49, 41, 22, 264/DIG. 5, DIG. 18; 521/61, 62, 64; 210/500.2

[56] References Cited

U.S. PATENT DOCUMENTS

| | | | |
|---|---|---|---|
| 2,107,637 | 2/1938 | Lefebvre-Carnot et al. | 264/49 |
| 2,297,018 | 9/1942 | Overstreet | 264/54 X |
| 2,676,929 | 4/1954 | Duddy | 521/61 |
| 2,894,289 | 7/1959 | Harper et al. | 264/49 |
| 2,894,855 | 7/1959 | Wilhelm et al. | 264/54 X |
| 2,904,840 | 9/1959 | Hochreuter | 521/61 X |
| 2,997,448 | 8/1961 | Hochberg | 521/61 X |
| 3,062,760 | 11/1962 | Dermody et al. | 521/61 X |
| 3,214,290 | 10/1965 | Larner et al. | 264/54 X |
| 3,220,960 | 11/1965 | Wichterle et al. | 264/49 X |
| 3,222,437 | 12/1965 | Schilling | 264/54 |
| 3,268,458 | 8/1966 | Strauss et al. | 264/49 |
| 3,345,439 | 10/1967 | Everard et al. | 264/54 X |
| 3,375,209 | 3/1968 | Kemper | 521/61 X |
| 3,376,238 | 4/1968 | Gregorian et al. | 521/61 X |
| 3,379,658 | 4/1968 | Kemper | 521/61 X |
| 3,562,367 | 2/1971 | Shinohara et al. | 264/54 X |
| 3,816,575 | 6/1974 | Susuki et al. | 521/61 |
| 3,928,521 | 12/1975 | Haren et al. | 521/61 X |
| 3,992,495 | 11/1976 | Sano et al. | 210/500.2 X |
| 3,993,609 | 11/1976 | Kamens et al. | 264/54 X |
| 4,046,843 | 9/1977 | Sano et al. | 210/500.2 X |
| 4,096,099 | 6/1978 | Koyama et al. | |
| 4,107,049 | 8/1978 | Sano et al. | 264/41 X |
| 4,109,066 | 8/1978 | Dick et al. | 429/145 |
| 4,115,303 | 9/1978 | Marchand et al. | 521/61 X |

FOREIGN PATENT DOCUMENTS

| | | | |
|---|---|---|---|
| 0012557 | 12/1979 | European Pat. Off. | |
| 1495835 | 8/1967 | France | 264/49 |
| 2312529 | 12/1976 | France | |
| 53-30661 | 3/1978 | Japan | 521/61 |
| 838824 | 6/1960 | United Kingdom | 264/DIG. 5 |
| 864815 | 4/1961 | United Kingdom | 264/54 |

OTHER PUBLICATIONS

Michaels, A. S., "New Separation Technique for the CPI" in *Chemical Engineering Progress*, vol. 64, No. 12, pp. 31–43.

"Hackh's Chemical Dictionary", Fourth Edition, Completely Revised and Edited by Julius Grant, New York, McGraw-Hill Book Co., ©1972, pp. 355, 388, 400, 434, 435.

"The Condensed Chemical Dictionary", Eighth Edition, Revised by Gessner Hawley, New York, Van Nostrand Reinhold, ©1971, p. 590.

Abstracts 47,709 8/15/1975 Cohen Zedek and Spisbach "Process for Preparing Membranes".

*Primary Examiner*—Philip Anderson
*Attorney, Agent, or Firm*—Murray Schaffer

[57] ABSTRACT

The invention provides a method for producing permeable polymeric membranes comprising decomposing, in a polymeric matrix, molecular moieties, bound to the polymer or contained in compounds dispersed therein, into smaller, discrete, molecular units, whereby the smaller, discrete molecular units, which are formed, spontaneously leave the polymeric matrix and a membrane of defined permeation characteristics is obtained.

14 Claims, No Drawings

METHOD FOR PRODUCING PERMEABLE POLYMERIC MEMBRANES

The present invention relates to a method for producing permeable polymeric membranes and to novel permeable membranes whenever prepared by said method. As is known membranes are fundamental to plants and living organisms with essential separations and transport processes being membrane-dependent. The detailed structure and functioning of plant and biological membranes have been the object of intense study for many years. Though far from being completely understood, it is clear that natural membranes are highly structured through their molecular organization and that therein lies the key to their astonishing selectivities and efficiencies.

A large variety of membranes having ion-exchange and selective permeability properties are thus known in nature. Fundamental mechanisms of their action are believed to depend on the presence of ionogenic groups (acidic or basic, or other chemically reactive entities) spaced in a well defined pattern in the membrane matrix. Size distribution of the pores and their spacing in the matrix, membrane thickness, nature and density of ionogenic, non-ionogenic, polar groups and chemically active entities are other characteristics which determine membrane properties. The body of evidence supporting the foregoing is impressive and theory is far in advance of accomplishment by man-made membranes.

As is also well known a separation of a component from its solution in a homogeneous fluid can be theoretically achieved with the greatest possible efficiency by a membrane that is freely permeable to the component being separated and impermeable to other components (or vice versa). One would have expected therefore that membranes would be widely used in industry. But, as a matter of fact, there are relatively very few uses compared to potential applications. The main reasons are in the limitations of present technique and processes for making permeable membranes. This is clearly seen when one compares the performance of man-made membranes with their limited range of separation capabilities to natural membranes that cover an enormous range of separations with incomparably better efficiencies.

Numerous permeable polymeric membranes made by a variety of methods have been described in the scientific literature going as far back as the middle of the nineteenth century. Interesting and useful separations have been achieved in the laboratory and many separations are currently commercially practiced: medicine, chemical industries, food processing, water desalination, metals recover—are an incomplete list of application areas. Still all these applications are recognized as lagging far behind the potential interest in membrane separations. This is firmly established by theory and abundantly illustrated by the extraordinary versatility of membrane separations in plants and in living organisms.

There is thus an enormous scope for progress in the art of polymeric membranes. Such progress is bound to be of great practical significance since membrane separations are in many cases, inherently the most efficient possible.

Granular ion-exchangers consisting of cross-linked polymers which carry the ionogenic groups covalently linked to the skeleton were probably the first and constitute still the bulk of commercial products used for their membrane separation capabilities. Ion-exchange membranes made by dispersing an ion-exchange powder in a polymer matrix or by grafting ionogenic groups to a preformed membrane are also used in electrodialysis.

Combinations of porosity and charge distributions are achieved in polyelectrolyte systems which crosslink by salt bridges. On these are based several commercial membranes which are proposed for separations between molecular species differring in molecular weights, ionic character or both.

Results achieved to-date in membrane performance fall far short of results that should be achievable, and this in spite of the enormous interest in membranes as instruments of separation. Why this sluggish development of the art? Several reasons stand out:

a. A polymer carrying strong acidic or basic groups or other strongly interacting chemical entities even if not cross-linked, will respond poorly to usual plastics fabrication techniques. If both acidic and basic groups are carried by a polymer it is likely to approach intractability.

b. The foregoing may appear to contradict the fact that A. S. Michaels (see e.g. Chem. Eng. Prog. Dec. 1968, p.31) has succeeded in fabricating membranes of polyacids ionically cross-linked to polybases. His methods require however polymers that are initially water soluble and fabrication is dependent on using concentrated electrolytes as solubilising or gelling agents. Thus, fabrication requirements impose special polymers and strongly limit attainable composition ranges.

c. Chemical attack of a preformed membrane, while feasible, has many inherent limitations due to requirements of satisfying reaction conditions which bear little relation (and may be even incompatible) with requirements of the desired membrane. Fine control of substitution density and pattern are obviously difficult if not impossible.

Thus, while membrane properties are fairly rapidly established in essentials, membrane making is slow, laborious and costly. A list of ultrafiltration membranes given by A. S. Michaels indicates serious limitations with respect to all. The limitations of common ion-exchangers (e.g. high liquid retention) are so well known as to be taken for granted. Progress appears to depend decisively on an approach which will permit making membranes with simplicity, in many composition ranges within which continuous variations will be possible. This requirement is a condition of effective screening and optimisation.

As is further known, a major source of difficulties in making membranes of predetermined characteristics is the frequent incompatibility of permeability requirements with processing requirements. Thus for instance, permeabilities which are induced by "phase inversion" which takes place on contact of polymer solutions with nonsolvents. The polymer gel that is obtained dries to form the membrane. Obviously in this process permeability inducing and film fabrication are inextricably bound together and are mutually limiting. Porous membranes in particular are subject to the kind of incompatibilities illustrated above, since ordinary plastic fabrication methods are all directed to obtaining dense, pore-free films, fibers, etc.

Another factor to be considered is that various functional groups are essential to numerous membrane separations. Cationic or anionic groups built into the polymer matrix forming anion-exchangers and cation-exchangers respectively have particularly extensive uses. Many other functional groups capable of selective interactions with dissolved species and thereby influencing transport of such species across the membrane have been recognized in natural membranes; artificial membranes carrying such groups have been of increasing use in laboratory work and have potentially broad industrial applications. At present the fact is that most ion-exchange membranes and other functionalized membranes are applied in the form of granular solids due to the difficulty of obtaining satisfactory films, hollow-fibers and other shapes that are the more desirable forms for membrane separation purposes.

It is an object of the present invention to meet this long felt need and to provide a new method for making permeable membranes which provides for advantages generally not attainable at present.

This is achieved by the present invention which provides a method for producing permeable polymeric membranes comprising decomposing, in a polymeric mass, molecular units, bound to the polymer or contained in compounds dispersed therein, into smaller, discrete, molecular units, whereby said smaller, discrete molecular units, which are formed, spontaneously leave the polymeric mass and a membrane of defined permeation characteristics is obtained.

Thus the present invention provides for many and varied improvements over present art of polymeric membranes through a novel way of imparting permeability namely, providing a single phase polymeric mass consisting essentially of a polymeric backbone and pendant groups having decomposable molecular units chemically bound to said polymeric backbone or contained in compounds compatible with the polymer and consequently molecularly dispersed in said polymeric mass and inducing the decomposition of said molecular units into smaller, discrete molecular units which spontaneously leave the polymeric mass by diffusion without decomposition of said polymeric backbone.

Said molecular units which are introduced into the polymeric mass in order to be decomposed and result in the formation of pores will be referred to in many places in the text hereinafter as "porogens" for clarity and ease of identification. Similarly, porogens which decompose with the liberation of ionisable or other chemically reactive groups attached to the polymer will be designated "ionogens" (the term porogen is a coined word referring to molecular units which generate pores and similarly, the term ionogens is a coined word having the meaning set forth hereinbefore).

In one preferred embodiment of the present invention said molecular moieties are contained in porogen compounds dispersed in a selected and prepared polymeric mass which compounds fully decompose to form small discrete molecules which substantially all leave the polymeric mass whereby a permeable membrane substantially consisting solely of the selected polymer is obtained.

In yet another preferred embodiment of the present invention selected molecular units (ionogens) are introduced into said polymeric mass, which moieties decompose to selectively leave behind, at the decomposition sites in the polymer mass, chemically active groups.

The term 'active groups' as used herein is intended to designate charged groups such as acids, bases and metal ions, charged complexing groups such as aminocarboxylic acids, non-charged complexing groups such as "crown ethers" and other macrocycles, cryptands and generally any group that interacts with a species involved in a membrane separation.

Especially preferred are charged chemically active groups.

A fuller process according to the present invention preferably comprises:
(a) forming a uniform polymeric mass containing at least one polymer and molecular units which may be chemically attached to said polymer or to a compound dispersed therein and which units can be induced to decompose to a predetermined extent into smaller discrete molecules;
(b) shaping the polymeric mass into a desired membrane form;
(c) inducing the decomposition of said units in said polymeric mass whereby said smaller discrete molecular units, which are formed, spontaneously leave the polymeric mass; and
(d) allowing the resultant shaped polymer to stabilize.

The term stabilization as used herein refers to the maintenance of the membrane during and/or after inducing decomposition in defined conditions in particular with respect to the medium in contact with the membrane, tension in the membrane and temperature.

In some cases stabilization is practically coincidental with decomposition while in others there is further change after decomposition. In the last case it is useful for the sake of reproducibility to let stability be reached under controlled conditions.

Especially preferred results are achieved when said decomposition is induced while maintaining said membrane under tension.

In several preferred embodiments of the above described process after said polymeric mass is shaped into desired membrane form, it is subject to cross-linking, e.g., prior to actual decomposition or concurrent with said decomposition by known irridation or chemical means.

It is to be noted that the term polymeric membrane as used herein is intended to include all polymeric permeation structures, which may be in film, granular, tubule, hollow fiber and other analogous standard forms known per-se in the art. Thus the term membrane is used in its broad functional meaning and is not intended to narrowly define only a specific class of membranes such as films since it will be recognized that the methods of the present invention are applicable to the preparation of all of said types of polymeric permeation structures which preparation constitutes a major aspect of the present invention.

Similarly the term molecular units as used herein is intended to include both entire molecules and parts thereof as discussed more fully hereinafter.

Moieties or molecules that decompose rapidly into small fragments are well-known in chemistry and are sometimes utilized for synthetic purposes e.g. tertiary-butoxy carbonyl when attached to an amine group protects it during various chemical transformations and then is eliminated by the action of a strong acid which induces the decomposition into butene and carbon dioxide according to the following reaction:

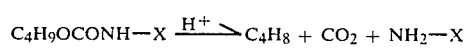

wherein X is the group carrying the amino ($-NH_2$) group.

Thus molecular units which are suitable for use in the method of the present invention can be conceived and easily synthesized by any competent organic chemist, suffice to select reactions that are rapid and that can be induced by heat, radiation, acids, bases, and other reagents and have the corresponding unit or units expressed in molecules appropriate for each specific purpose.

In Table 1 hereinafter there are listed different type of tertiary butyl esters which are decomposable with strong acids and comments with regard to each type listed.

TABLE 1

| Nature of Component | Formula | Decomposition Products | Comments |
|---|---|---|---|
| Monoester of carboxylic acid | RCOObu* | RCOOH, $C_4H_8$ | If R is H or small alkyl or aryl the ester will be completely decomposed leaving a membrane of the original polymer; if R is large, RCOOH molecules will tend to remain in the membrane in association with the porosity. |
| Diester of dicarboxylic acid | R(COObu)$_2$ | HOOCRCOOH, $C_4H_8$ | As above. The tendency of diacids to anchor in a polymer could be more pronounced then monoacids. |
| Butoxycarbonylamide | buO(CO)NHR | $RNH_2$, $CO_2$, $C_4H_8$ | Amines $RNH_2$ will leave or stay in polymer membranes similarly to carboxylic acids above. |
| Carboxyamide of an ester of amino acid | R—CH—COObu<br>    \|<br>    NH<br>    \|<br>    buO(CO) | R—CH—COOH, $CO_2$<br>    \|         $C_4H_8$<br>    $NH_2$ | An alpha amino acid may be implanted in a membrane in association with the formed pores. |
| Silicate | (buO)$_4$Si | Si(OH)$_4$,$C_4H_8$ | Silic acid-polymer compositions could be obtained as membranes of desirable property combinations. |

*bu designates tertiarybutyl $(CH_3)_3C$—

In Table 1A hereinafter there are specifically named just several of the esters and amides which could be used in the methods of the present invention and relevant physical properties thereof.

TABLE IA

| Name and Formula | MW | Estimate diameter per molecule Å |
|---|---|---|
| Esters of TBOH ($C_4H_9O$ = 73) | | |
| Acetate, CH$_3$COOC$_4$H$_9$ | 116 | 6.9 |
| Chloroacetate, CH$_2$ClCOOC$_4$H$_9$ | 150.5 | 7.5 |
| malonate, CH$_2$(COOC$_4$H$_9$)$_2$ | 216 | 8.5 |
| dicarbonate, (C$_4$H$_9$OCO)$_2$O | 218 | 8.5 |
| orthocarbonate, (C$_4$H$_9$O)$_4$C | 304 | 9.5 |
| orthosilicate, (C$_4$H$_9$O)$_4$Si | 320 | 9.7 |
| Esters and amides of (C$_4$H$_9$OCO = 101) | | |
| MeNH$_2$, C$_4$H$_9$O(CO)NHCH$_3$ | 131 | 7.2 |
| Ethyleneglycol, (C$_4$H$_9$O(CO)OCH$_2$)$_2$ | 262 | 9 |
| Ethylenediamine, (C$_4$H$_9$O(CO)NHCH$_2$)$_2$ | 260 | 9 |
| Glycerol, (C$_4$H$_9$O(CO))$_3$O$_3$H$_5$C$_3$ | 392 | 10.5 |
| Ethanolamine, (C$_4$H$_9$O(CO))$_2$NHCH$_2$CH$_2$O | 261 | 9 |

The above lists can be obviously expanded to include a large number of compounds to provide numerous molecular units (hereinafter M.U.) chosen for desirable properties, in particular compatibility with a selected polymer and current technologies of its fabrication as well as the desired membrane characteristics.

The large variety and enormous number of compounds that are known or that can be synthesized, of which a tertiary butyl ester forms a unit, provide for a wide scope of regulating permeabilities through the inducement of porosities and acidic, basic and other active groups associated with these porosities. However the class of tertiarybutyl esters is by no means the only one. There are many other classes that can be applied in the present invention in ways that will be obvious to chemists. A partial list of such classes is enumerated and briefly characterised in Table 1B hereinafter.

TABLE 1B

| Class | Formula | Comments |
|---|---|---|
| Azides | R—N$_3$ | decompose by heat or light with liberation of nitrogen |
| Peroxides | R$_1$—O—O—R$_2$ | decompose by heat or light with cleavage to smaller entities |
| Nitrite esters | RONO | hydrolyse easily with liberation of nitrogen oxides |
| Diamino methane derivatives | H$_2$C$\diagup$$^{NR_1R_2}$$\diagdown$$_{NR_3R_4}$ | cleaved by acids with the formation of ammonium salts and formaldehyde. |
| dioxethanes | R$_1$R$_2$C—CR$_3$R$_4$<br>    \|     \|<br>    O—O | cleaved by radiation into two keto compounds |
| Diazo | R$_1$—N=N—R$_2$ | cleaved by radiation |
| Alpha keto carboxylic acids | R—CO—COOH | decompose with liberation of $CO_2$ |
| Metallocarbonyls e.g. benzene chromium tricarbonyl | bzCr(CO)$_3$ | decompose by heat and light to arenes (or dienes) and the metallic elements |

A distinctive characteristic of the present invention is the ease with which chemically reactive groups can be implanted in the membrane even when for reasons of chemistry such groups may not be easily grafted onto an existing polymeric mass. Thus for instance, acidic groups and basic groups can be concurrently implanted in a membrane in any desired proportion simply by forming a pre-membrane made of polymer containing porogens masked by decomposing leaving groups which are acidic and basic in the desired proportions.

Porogens that upon decomposition leave acidic and basic groups are mutually compatible since the masked acids and bases do not interact and therefore can be used concurrently to form a polymer composition that lends itself to shaping. On decomposition the acidic and basic groups liberated are fixed in place. A variant of this possibility consists of implanting porogens which contain an acidic group and a basic group carried by the same molecule, e.g., an amino acid. In contradistinction to the present method achieving the same result by grafting acids and bases onto a polymer mass has heretofore been virtually impossible by known techniques.

The flexibility of implanting chemically reactive groups can be further modulated by sequential decompositions, each decomposition being actuated by the appropriate method, e.g., a first decomposition induced by radiation followed by decomposition induced by acid or vice-versa. The first decomposition may provide the access needed for the agents inducing subsequent decompositions. This and other possibilities will be obvious to the man skilled in the art in light of the present invention.

A competent chemist desirous of constructing a membrane combining a defined permeability and chemical activity has thus a large choice of options simply derived from known chemistry and polymer science which can be applied to the practice of the present invention and it should thus be clear from the foregoing that molecular units and molecules can be easily selected that will decompose to predetermined extent into small molecules for fabrication of permeable polymeric membrane structures according to the method of the present invention.

Some of the advantages of the method of the present invention reside in that:
 (a) Permeability can be finely adjusted through permeation sites established by decomposing molecular units of predetermined structure;
 (b) These permeation sites are built into common low-priced polymers such as polyethylene, nitrocellulose, PVC and many others;
 (c) Existing plastics technology is applicable to shaping of membranes so as to obtain films, hollow-fibers or any other desired shape. This application of technology is made possible by the fact that the modified polymer or polymer porogen combination does not differ from non-plasticised and plasticised polymers that are normally used in the fabrication of shaped plastics (films, fibers, hollow fibers, etc.) only that in the present case permeability is induced after fabrication; and
 (d) A wide range of chemical reactivites can be adjoined to permeation sites e.g. ion-exchange. This can be used to affect permeation properties as well as to effect chemical changes in combination with permeation.

For better appreciation of the innovative aspects of the new method several aspects of existing methods are reviewed below.

One method by which porous membranes are made consists in treating a dense membrane by a solvent that swells the membrane then allowing the solvent to evaporate. A treatment by a non-solvent may be interposed.

It is obvious that by this method porosity is not directly controllable but rather indirectly determined by the many parameters that determine the structure of a dried gelled polymer. Reproducibility in particular is difficult.

Another process for making porous membranes is based on sintering porous polymer particles. The limitations of this technique are such that it is applied in practice only to highly refractory materials such as perfluorinated polymers which do not lend themselves to other techniques.

Charging a polymer with solid particles, mineral or polymeric, followed by the leaching of these particles by an appropriate solvent is an effective way of obtaining coarse porosity in the 0.1 to 10 $\mu$m range but does not provide a method for uniform porosities e.g. in the range of 2 to 100 Å i.e. 0.0002 to 0.01 $\mu$m to satisfy needs of sharp separation of soluble species by size.

"Phase-inversion" membranes obtained by gelling a polymer solution by means of a non-solvent to that polymer are the most important commercial membranes, however it is very difficult to obtain defect free membranes by said process. Furthermore their very mode of manufacture imposes severe limitations or completely excludes widely applied methods of plastics fabrication such as extrusion, calendering and injection molding.

Ion-exchange membranes are generally formed by chemically grafting acidic or basic groups to preformed membranes. Obviously the location of such groups with respect to pores cannot be directly controlled, though this would be highly desirable.

Charged membranes endowed with remarkable properties are obtained as polyelectrolyte complexes between cationic and anionic polymers. These are ascribed to the existence of charged zones defined by these polymers. Unfortunately polyelectrolyte complexes are generally obtained by precipitation from concentrated aqueous electrolyte solutions of very special polymers, polyacids and polybases, very different from common polymers, thus precluding the application of current plastics technology.

The foregoing is not a complete list of all methods and processes proposed for making membranes. It covers however most of those currently used and these bring out that the present art of membranes making lags for behind recognized needs that could be answered by membranes of defined structure so as to obtain specified permeability characteristics as now producable according to the method of the present invention.

Thus in contradistinction to said prior art methods, the present invention provides for inducing porosity in a polymeric mass fabricated to any desired shape. The induction of porosity may be accompanied with the implantation of reactive groups such as acidic, basic, and others closely associated with the porosity to confer ion-exchange, ion complexation solvent characteristics or other properties on the membranes. Furthermore, membranes may be made according to the invention which consist of a single polymer, or a mixture of polymers or a dispersion of small molecules in the polymer, thus providing numerous choices in engineering membranes of predetermined characteristics and acceptable production costs.

All of this is achieved by effecting one or several chemical reactions in the polymeric mass to introduce molecular units which form part of the polymeric backbone or which are uniformly dispersed in it. Thus, as discussed hereinbefore, tertiarylbutyloxy groups $(CH_3)_3—C—O—$ (to be designated buO) and tertiarylbutoxycarbonyl groups $(CH_3)_3COCO—$ (to be designated buC) are known to decompose under the influence of strong acids, e.g., buO—CO—CH$_3$, will decompose to $CH_3COOOH$ and $C_4H_8$; buC-NHR decomposes to $RNH_2$, $C_4H_3$ and $CO_2$. When these groups are part of the polymer backbone or a moiety of a compound uniformly dispersed in the polymeric mass, the decomposition can be effected in a controlled fashion and the small molecules which form on decomposition ($H_2O$, $C_4H_8$, $N_2$, $CO_2$ etc.) diffuse out the polymeric mass. When this mass is shaped prior to decomposition as a film, tubule, hollow-fiber etc., proper conditions are maintained during decomposition and subsequent conditioning applied, a permeable membrane is obtained.

Porogens which decompose to molecules small enough to diffuse easily out of the polymer matrix provide for porosity only. Thus porogens may be selected so as to decompose to leave only a polymer mass or porogen ionogens may be chosen to selectively leave at the decomposition sites moieties retained in the polymer matrix by virtue of size and/or other properties. Thus a molecular unit serving as a porogen can be attached virtually to any group possessed of the activity which one desires to associate with permeability generated on porogen decomposition. This attachment may be by a direct chemical bond as in the case of e.g. a sulfonic acid ester of tertiary butanol when it is desired to retain the sulfonic acid group associated with permeability or it may be by any convenient attachment in molecular vicinity to the active group. Charged active groups, e.g. $-COO^-$, $NR_c^+$ are of particular broad application due to their ion-exchange properties and are therefore extensively illustrated in the examples. However from the chemical point of view there is no limitation on the character of the active groups that may be selected for association with permeability.

The practice of the present invention also provides for easy fabrication of the membranes by using thermoplastic polymees and if desired in relatively low molecular weight ranges and subsequently obtaining the desired degrees of stiffness, strength, temperature stability and other properties characteristic of high molecular weight cross-linked polymers. This is simply achieved by known techniques of cross-linking by electron fluxes and other means such as U.V. irradiation well known in the art. By subjecting the preformed membrane to these cross-linking techniques after the incorporation of molecular units, ease of fabrication is achieved with respect to end polymers that are by themselves intractable with regard to ordinary plastics technology. It is obvious that in some cases cross-linking and porogen decomposition can be concurrently achieved when the same decomposition means (e.g. irradiation) is effective for both purposes.

A major advantage of the present invention resides in its adaptability to the modification of present membrane making processes. Thus: (1) chemically reactive groups may be introduced via monomeric or polymeric porogens during the initial formation process (e.g. evaporation of polymer solutions; melt-spinning etc.) rather than by subsequent chemical attack; (2) macropores may be obtained by decomposing porogens rather than depending on solvent swelling followed by evaporation; (3) assymetry may be built by allowing molecules dispersed in a polymer matrix to migrate and orient with respect to a directionally developing porosity (due to a directional decomposition of a porogen). Generally the practioner should be able to improve in many cases on existing processes by applying this invention to selected steps thereby achieving simplification in manufacture and/or an improved product.

The term permeation as used herein is understood to designate transport characteristics across the membrane whether spontaneous as in dialysis, pressure induced as in "reverse osmosis" or electrically induced as in "electrolysis". Permeation may result in specific cases by a continuous flux through the membrane as e.g. in ultrafiltration or by the selective retention of species as in liquid or gas chromatography or in ion-exchange.

The inducement of permeation characteristics may depend uniquely on decomposing porogens that disintegrate fully to small molecules that leave the polymeric mass as illustrated in various examples hereinafter. Similarly or alternatively as already explained hereinbefore ionogens may be selected that leave behind groups active in permeation. Thus tert. butyl ester groups bound to the polymer will free on decomposition carboxy groups bound to the polymer. An ion-exchange membrane is thus obtained in which pore-sites and exchange groups are closely associated by virtue of their being formed concurrently at the same point. Such precise conformation has not been described before.

Molecules unattached to the polymer in the polymeric mass but compatible with it by virtue of solubility or extreme dispersion (similarly to regular plasticizers) may leave on decomposition molecules that are inherently incompatible with the polymer but which are now anchored in it by virtue of molecular interactions that render phase separation practically impossible. Thus, for instance dodecanedioic acid, which by itself is not molecularly dispersible in PVC, can be obtained, fully molecularly dispersed, by using the di-tertiary-butyl ester (see e.g. Example 9 hereinafter) which is fully compatible with PVC forming with it polymeric masses easily fabricated into desired shapes by conventional techniques.

It is thus seen that the invention provides for a novel way of making polymers which carry active groups through the anchoring of desired molecules in preformed polymers. Furthermore these active groups are sited in close coordination with pores when these are induced through the same molecular units attached to the active group prior to decomposition.

In cases in which it is desired to decompose the porogen by the action of a chemical reagent rather than by heat or irradiation there is an apparent problem of access of the reagent to a porogen dispersed in a dense polymer mass. This apparent problem which may partly explain why permeability inducement according to the present invention was not tried before can be overcome in one of several ways in the practice of this invention.

Thus, e.g., when porous membranes are formed the attack can proceed from the surface of the polymeric mass in contact with the solution of the reagent (e.g. an aqueous mineral acid). The porosity that is generated permits progressive penetration by the reagent until completion of porogen decomposition.

Alternatively when the porosity obtainable by a porogen decomposition is insufficient for the penetration of the reagent, an additional easily decomposed porogen may be added (See, e.g., Example 10 hereinafter).

A particularly useful method consists of including small catalytic amounts of the reagent in the polymeric mass and inducing the reaction following fabrication by an increase in temperature. It was surprising to discover that strong acids such as methylsulfonic acid will maintain their catalytic action relative to porogen such as tertiary butyl esters in the absence of solvents. This (as illustrated in Example 2 hereinafter) obviously provides for a convenient continuous membrane fabrication by subjection the polymeric mass to shaping followed immediately by a mild raising of temperature to effect porogen decomposition.

A useful variation of the dispersed catalyst consists in using derivatives of the chosen catalyst (e.g. tertiarybutyl ester of methylsulfonic acid) which by itself is resistant to relatively stringent fabrication methods and allows for indefinite stability in conjunction with molecular units. The derivative is chosen to mask the catalytic activity but to reveal it under appropriate conditions, i.e., to constitute a pre-catalyst. Such a precatalyst, when decomposed at the surface, will generate free acidity which progressively will decompose acid sensitive porogens of which the precatalyst is one.

Porogen decomposition, as will be obvious from general knowledge of the chemistry involved, may be a rapid or a slow process depending on catalyst concentrations, temperatures, intensity of irradiation etc. It is further obvious that, concurrent with and following porogen decomposition, some molecular reorganization takes place which could involve more or less closing of, or fusion of, initial porosities of molecular dimensions. The nature of the medium which penetrates porosities on their formation, the tensions and their direction in the polymer mass during decomposition and cross-linking induced prior to decomposition or made to take place concurrently with decomposition all are predictably influential with respect to definitive characteristics obtained in the membrane. Thus the ensemble of the conditions under which permeability is induced in the polymeric mass may be controlled in order to secure a high degree of reproducibility and may be experimentally optimized for a given purpose.

The variety of membranes which can be made is extremely large. A scientist conceiving the structure of a membrane can think out easily routes according to this invention that make such a membrane accessible. Thus for instance if a porous membrane with alpha amine carboxy groups associated with fine porosity is desired, it is obvious that a moiety having the structure

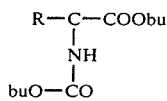

would provide the alphaamino carboxy groups on decomposition by means of a strong acid and in association with a basic pore calculated to be of the order of 8 Å in diameter if obtained as a single pore containing the said group. This is of course a calculated value, actual porosities are defined by permeabilities with respect of selected gases or solutes. To take this example further, rather than tying the desired group to the polymer backbone one may consider anchoring it in a common polymer by virtue of an R group compatible with the polymer, or by means of a second alphaaminocarboxy group at the opposite end of a chain which could provide for anchoring through attractive forces between these very polar groups situated on different molecules. The foregoing is just an illustration how the present invention provides for the conceptual and practical engineering of new membranes by applying existing knowledge of chemistry, physics and polymer technology.

While the invention will now be described in connection with certain preferred embodiments in the following examples so that is may be more fully understood it is not intended to limit the invention to these particular embodiments. On the contrary it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of procedures as well as of the principles and conceptual aspects of the invention.

COMPARATIVE EXAMPLE A

Polyvinylchloride (P.V.C.) films were cast from a solution of 3% (w/v) P.V.C. (type Epivyl 46 of Frutarom viscosity number 138, Inherent viscosity 1.08) in tetrahydrofuran (T.H.F.) containing 0.3% cyclohexanone. This solution was spread on a dry glass plate (which was previously thoroughly cleaned and placed on a leveled table), using a doctor's blade recessed to 1 mm. After 30 minutes at room temperature, during which most of the solvent evaporated, the glass bearing the film was transferred into a drying oven and held there at a temperature of 45° C. for 20-24 hours. A transparent homogeneous film was then peeled off the glass quite easily.

The permeability of the film was tested using an instrument made of two open perspex compartments, between which two perspex disks were held. Each of these disks had a circular opening of 15 mm in diameter. Neoprene "0" rings were present between each two neighbouring perspex parts in order to prevent leaks and short circuiting. These "O" rings were held in place by matching grooves in the perspex. In each compartment there was a circular hole, about 15 mm in diameter at the upper part, permitting the filling and emptying of each compartment (with test solutions or wash liquors). The two compartments and the disks were assembled in a rectangular metal frame and fastened together by two screws, attached to this frame. The films were held between two neoprene "O" rings.

The permeability of the films to HCl was tested by filling one compartment with a 4N solution of HCl and the other compartment with a very dilute solution of the indicator bromophenol blue. Changes in the color and in the pH of the indicator solution were followed for up to 10 days (time periods needed for pH in tested solution to go down to pH=2 and pH=1 will be designated as $t_2$ and $t_1$ respectively).

A number of PVC films, prepared by the technique described above, were tested for HCl permeability. In most cases the color and the pH of indicator solution remained unchanged. In a few other experiments there was a decrease in the pH of this solution, but the lowest pH after 10 days was 2.5 whereas the concentration of acid in the other compartment remained virtually unchanged at 4N. This indicates that a difference of about three orders of magnitude between the concentration of acid in the two compartments still remains, even when some permeability can be perceived.

These permeability tests prove that these films are either completely impreamble to aqueous HCl or have a very low permeability.

The purpose of this experiment was to first establish that PVC films obtained by casting from solvent are virtually impermeable when using aqueous HCl to test permeability.

This is of great importance since techniques exist in the prior art to make permeable films and filters (membranes) by casting from solvents under special conditions. In all these techniques the formation of permeability is determined by the mode of elimination of the solvent from the forming polymer film. In contradistinction however to said prior art methods in the case of the present invention the formation of an impermeable film which is a premembrane by casting from solvent or by another method—precedes the inducement of permeability.

EXAMPLE 1

Films were cast from solutions of 3% PVC in THF+0.3% cyclohexanone containing also 1.0%, 1.5% or 3% (w/v) of one of the following porogens: t-butyl p-toluenesulfonate (TBPTS), di-t-butyl dicarbonate (DTBDC), di-t-butyl dodecandioate (DTBDD) and di-t-butyl adipate (DTBA).

The formation and permeability tests of these films were conducted using the same methods as described in Comparative Example A.

The films formed were softer and more elastic then the films without esters as expected since these esters act as plasticisers of PVC and were impermeable to aqueous HCl prior to the decomposition described below.

Some of these films were held in concentrated HCl solution (32% w/w) at a temperature of 40° C. for 20-24 hours in a closed vessel (which was previously partially evacuated), either when still attached to the glass or after being peeled off the glass. After washing in water and drying IR spectra of the films were recorded. These spectra were compared to the spectra of similar films, which were not treated with concentrated HCl. The results indicated that treatment in HCl caused ester decomposition in that lines characteristic of the

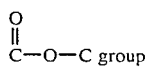

disappeared. In the case of the dodecandioic or adipic esters absorption lines of the free acid appeared, whereas with the dicarbonate and p-toluenesulfonate esters no decompsition products appeared on the spectrum.

Films, which were treated for decomposition of the esters in HCl solution while not being attached to glass, shrunk considerably to the point, in many cases, of complete impermeability to HCl. Some of the films, which were put into HCl solution while being attached to glass, detached from it, others were partly detached and only few remained fully attached. All the films shrunk to some degree. The permeability of these films toward aqueous HCl varied in a wide range depending on the extent of film shrinkage—the more shrunk, the less permeable is the film.

From this example, it is learned that porogens, such as esters, containing molecular units capable of decomposition into small molecules can be decomposed while molecularly dispersed in a polymer, and that some compounds completely decompose and leave the polymeric while others will leave behind active groups in the polymeric matrix.

EXAMPLE 2

Films were produced from solutions containing 3% w/v PVC 1-3% w/v di-tert-butyl dodecanedioate (DTBDD) and 0.125-0.25% w/v methyl sulfonic acid (MSA) or 0.25-0.5% w/v para-toluene-sulfonic acid (PTSA). The solvent was THF containing 0.3% cyclohexanone. The solution was spread on a dry plate of glass, held 30 minutes at room temperature and 2-24 hours in a drying oven at 45° C., as described in comparative Example A.

The films were fully attached to the glass during and at the end of the procedure and no sign of shrinking could be observed. In a few cases some gas bubbles appeared between the film and the glass.

Films, prepared as described above, were easily peeled off the glass. Their IR spectrum showed disappearance of the absorption lines of DTBDD and appearance of the absorption lines of free dodecanedioic acid. These films showed a considerable permeability toward aqueous HCl (see Examples 4 and 5 hereinafter).

In some preparations tin plates and aluminium foil were used instead of the glass plates. Though in some cases the films were somewhat opaque, probably due to contamination, similar permeabilities were obtained. This shows that glass is not unique as a substrate for pre-membrane film obtained by evaporation.

EXAMPLE 3

Films made of nitrocelulose (NC) containing 50% (weight percentage on the polymer) of DTBA or DTBDD, with or without methyl sulfonic acid as a decomposition catalyst, were prepared from solution containing 4% (w/v) nitrocelulose of '½ sec', 2% prorogen, and 0.125% MSA, in n-butyl-acetate containing 4% n-butanol. The n-butanol was included, since the polymer used contained n-butanol in a 1:1 proportion. The methods used for casting the films and for decomposition of the porogens were the same as described in comparative Example A and Example 2.

The films were fully attached to the glass during and at the end of the drying and decomposition period, and no sign of shrinking was observed.

The films were easily peeled off the glass. Their IR spectra showed disappearance of the absorption lines of DTBDD or DTBA, and appearance of absorption lines of free dodecanedioic or adipic acids.

These films showed a behaviour similar to that described in Example 2: the porogen decomposed, the films did not shrink, and were permeable to aqueous HCl. Films which did not contain a decomposing catalyst, were impermeable, or only slightly permeable to aqueous HCl.

EXAMPLE 4

Films were made in the method described in Example 2 from solutions containing di-tert-butyl dodecanedioate (DTBDD) as the decomposable moiety. These films' permeability to aqueous HCl was tested in the method described in Comparative Example A. These tests were repeated several times with washing of the film inside the instrument in a stream of tap water after each test. There was a considerable difference between permeability of HCl in the first test ($t_2$—the time by which pH in the indicator solution went down to 2 was in the order of several hours) and permeability in the other tests ($t_2$ was in the order of several minutes). Films washed in a stream of tap water for about 2 hours previous to tests in HCl permeability showed the high permeability in the first test as well.

The effect described above was observed in tests of films made from solutions containing DTBDD, but was not observed in tests of films made from solutions containing DTBDC or DTBA.

From the above results it can be learned that the stabilisation of membrane is instantaneous on decomposition with some molecular moieties or may require some time and be influenced by the medium in which it is allowed to take place.

In order to enable better comparison, all results of HCl permeability in the following examples are given for second tests or for films prewashed in a stream of tap water.

EXAMPLE 4a

The effect described in Example 4, with PVC films containing DTBDD, was also observed with NC films containing DTBDD: these films showed a considerably increased permeability toward HCl, after being washed with tap water for about two hours.

Films containing DTBA instead of DTBDD, did not show this change in permeability after being washed.

EXAMPLE 5

Films were prepared in the method described in Example 2 from solutions containing PVC, di-t-butyl dodecandioate (DTBDD) as the decomposable porogen and methyl sulfonic acid (MSA) or p-toluene sulfonic acid (PTSA) as catalysts.

The effect of the amounts of DTBDD in the solution (keeping all other parameters unchanged) on the permeability of the film toward aqueous HCl was tested. Tests were made in an instrument like the one described in comparative Example A. The periods by which the pH in the indicator solution went down to 2 ($t_2$) and to 1 ($t_1$) were measured. It was found that for a film made from solution in which the amount of porogen is equal to the amount of polymer $t_2$ was 2 minutes and $t_1$ was 10 minutes. Lowering the amount of porogen in the solution results in longer $t_2$ and $t_1$ periods. For a film, made from solution in which the M.M. amount is 30% of polymer amounts, $t_2$ was 25 min. and $t_1$ was 200 minutes—about 20 times longer than $t_2$ and $t_1$ mentioned above.

The effects of acid (catalyst) amounts in the solution on the permeability of film toward aqueous HCl were tested by a similar process. It was found that films made from solutions containing more acid (up to 16.5% of the amount of the polymer) were somewhat more permeable. Thus in a typical case a film made from solution of 3% PVC, 1.5% DTBDD and 0.25% of PTSA as catalyst gave for HCl permeability $t_2 = 10$ minutes. Another film made from a similar solution containing 0.5% PTSA was more permeable $t_2 = 5$ minutes.

Thus it can be seen that permeability characteristics for given polymer—molecular moiety combinations are adjustable by varying the molecular unit and catalyst proportions although the former, as might have been expected, is the more important one.

EXAMPLE 6

Permeabilities of various films (prepared in the method described in Example 2) were examined by means of polyethylene glycols (PEG's) of narrow molecular range. The experiments took place in an instrument like the one described in comparative Example A. One compartment contained 0.5N solution of the PEG used in the test and the other contained water. The concentration of the PEG in the second compartment, 48 hours after the experiment started ($C_{48}$) was measured, by the refractive index of the solution.

Films made from solutions containing DTBDD in an amount equal to 50% of the amount of PVC and methyl sulfonic acid (MSA) in an amount equal to 4.2% of the amount of PVC were tested. It was found, that while these films were quite permeable to PEG 400, they were unpermeable to PEG 1500. Another film, containing twice the amount of porogen was permeable to both polyethylene glycols but about 3 times more permeable to the smaller one.

In a similar way, permeability of different acids, different bases and different salts was compared. It was found, that HCl permeates more easily than p-toluene sulfonic acid, (4N solutions of the acids gave $C_{48} = 1000$ mM and $C_{48} = 250$ mM respectively), NaOH permeates more easily than tetrabutyl ammonium hydroxide (0.5N solutions of the bases gave $C_{48} = 40$ mM and $C_{48} = 12$ mM respectively) and NaCl permeates more easily than tetra butylammonium bromide (0.5N of salt solutions gave $C_{48} = 30$ mM and $C_{48} = 10$ mM respectively).

It can thus be seen that by the methods of the present invention uniform, finely differentiated permeabilities are achievable. PEG 400 has a calculated average diameter of 10.4 Å, PEG 1500—a diameter of 16.2 Å. Thus it is obvious that apparent calculated pore size of a membrane that allows PEG 400 to pass and blocks PEG 1500 conform with a distribution in which a large proportion of the porosity lies in the range 10.4 Å to 16.2 Å which is remarkably narrow.

EXAMPLE 6a

The permeability of the films described in example 3, towards PEG of low molecular weight—400 and 200—and towards the salts NaCl and tetrabutylammonium bromide (TBAB), was tested. The PEG molecules did not permeate through the films. TBAB ions permeated very slowly, and only to a limited extent. NaCl ions permeated at a rate similar to the rate of HCl permeation.

EXAMPLE 7

Films were prepared in the method described in Example 2. The effect of porogen amounts in the solution (keeping all other parameters unchanged) on the permeability of the film toward relatively large molecules was tested. Tests were made in an instrument like the one described in Comparative Example A.

Permeability of different polyethylene glycoles (PEG), was tested using three different films (all of which were permeable to HCl):

1. A film made from solution containing a decomposable molecular moiety in an amount equal to the amount of PVC (film A).
2. A film made from solution containing porogens in an amount equal to 50% of the amount of PVC (film B).
3. A film made from solution containing porogens in an amount equal to 30% of the PVC (film C).

Results of these tests are summarized in Table II:

TABLE II

|  | PEG 200 | PEG 600 | PEG 1500 |
| --- | --- | --- | --- |
| Film A | permeable | permeable | permeable |
| Film B | permeable | hardly permeable | impermeable |
| Film C | impermeable | impermeable | impermeable |

These results show that film permeability can be determined by the ratio of M.U. to polymer in the film prior to moiety decomposition.

The acid catalyst (methyl sulfonic acid or p-toluene sulfonic acid) content in the solution, (from which the film is formed), has a similar but smaller effect.

Obviously in any particular case, the two foregoing parameters could be used for fine adjustment of permeability.

EXAMPLE 8

Permeability of films (prepared as described in Example 2), to acid (in acid solutions) was compared to their permeability to base (in base solutions as equivalent concentrations). The films were more permeable to the acid. The difference in permeability was higher at low initial porogen content. As a typical example permeability of 0.5N solutions of HCl and NaOH was tested on a film made from a solution containing PVC, DTBDD and MSA. Permeability of HCl ($C_{48}=60$) was about 4 times higher than permeability of NaOH ($C_{48}=16$).

EXAMPLE 9

A powder containing 50% PVC and 50% PTBDD was prepared by dropping a solution of 1% PVC and 1% DTBDD in THF into distilled water, while stirring vigorously with a magnetic stirrer. An accurately weighed amount of the powder was treated in a concentrated solution of HCl (32%) at 40° C. for about 24 hours to achieve ionogen (DTBDD) decomposition. The resulting powder was then washed thoroughly with distilled water in a buchner funnel.

The ion exchange capacity of the resultant powder was measured: an accurately measured volume of 0.1N solution of NaOH was added to the powder and the mixture was stirred for 15 minutes. The powder was then filtered and the filtrate was titrated with 0.1N solution of HCl using phenolphtalein as indicator. The amount of base which reacted with the ionogen was calculated. The results show that the ion exchange capacity of the powder was about half the capacity predicted theoretically assuming two carboxylic groups per each ionogen molecule. After reacidification the whole process could be repeated many times with the same results.

A similar test was made on a powder made in the above method from a solution containing 1% PVC and 1% DTBDC (instead of DTBDD). This powder had no ion exchange capacity.

Thus it can be seen that the method of the present invention can be utilized for the preparation of an ion-exchanger from a polymer that by itself has no ion-exchange properties (PVC) and an acid that is not chemically bound to it, but effectively anchored and wherein porosity must be closely associated with chemical activity—a recognized desirable characteristic of ion exchangers.

EXAMPLE 10

Films were produced in the method described in Example 2 from solutions containing 3% w/v PVC, 1.5% w/v DTBDD, 0.6% w/v di-tert-butyl dicarbonate (DTBDC) and 0.125% w/v MSA. The permeability of the films formed was compared to the permeability of films, formed from similar solutions containing no DTBDC.

These films permeability to PEG 1500 (solution of 0.5N) was tested in the instrument described in Comparative Example A, measuring PEG concentration in the compartment which contained distilled water at the beginning of the experiment. After 48 hours the concentration ($C_{48}$) in the case of the films containing both porogens ($C_{48}=150$ mmol/liter) was considerably higher than in the case of the films made from solutions containing only DTBDD ($C_{48}=40$ mmol/liter).

These results show that film permeability can be altered by adding a different molecular moiety to the solution from which the film is made and further illustrates that porosity can be varied by using more than one porogen. If one porogen is of the type which leaves behind an active group on decomposition, i.e., an ionogen then the extent of porosity, as expressed by permeability, can be varied, if desired, independently of ion-exchange capability, by using a second porogen which is of the type which completely decomposes as described.

EXAMPLE 11

Permeability and permselectivity of films of PVC and N-buC α-amine Lauric acid-t-Butyl ester (α-Lau) as a porogen were examined by several tests. The formation and permeability tests were conducted using the same methods and instruments as described in Comparative Example A.

Spectrum I.R. of those films showed characteristic lines of the ester in those films where the αLau was not decomposed, whereas characteristic lines of the zwitterionic form of the α-Amino acid appeared in those films in which the ester was decomposed either by MSA or by a concentrated solution of HCl.

EXAMPLE 11 (a)

Films were made from a solution of 3% PVC+0.3% CYCLOHEXANONE and (α-Lau) as the porogen. Some of these films, as obtained by coating strips of flat glass, were held in a concentrated solution of HCl (32% w/v) at room temperature for 48 hours, in a closed vessel. Those films after 48 hours were partly or fully detached from the glass.

The films which were not treated by HCl were found to be impermeable to 4N HCl whereas those films which were tested were found to be permeable.

TABLE III (summerizes typical results)

| % αLau |  | 0.3 | 1.0 | 1.0 | 2.25 |
| --- | --- | --- | --- | --- | --- |
| Treatment with HCl |  | + | − | + | + |
| PH | 0 hours | 6.63 | 6.30 | 6.30 | 6.64 |
|  | 24 hours | 1.70 | 6.30 | 0.71 | 1.10 |

EXAMPLE 11 (b)

The membrane described in 11 (a) is immersed in a soluton of cupric chloride containing 5 grams per liter of the chloride and then rinsed with distilled water. The membrane is now loaded with copper while it still preserves the permeability of hydrochloride acid substantially unchanged.

EXAMPLE 11 (c)

Films were prepared in the method described in Example 2 from solutions containing PVC, α-Lau and MSA as the catalyst. The permselectivity of these films towards a solution of 0.5M NaCl and 0.5M KCl which was placed in one compartment of the diffusion cell was examined. A solution of triple distilled water was placed in the other compartment.

Samples were taken from both sides of the cell every several hours from zero time. Concentration of the Na+ and K+ were checked by atomic absorption.

The ratio of Na+ ions to K+ ions observed at the end of 22 hours was 5 to 1. Obviously, the membrane selectively distinguishes between ions which are generally difficult to separate.

EXAMPLE 11 (d)

Films were made from the same materials and in the same methods as in Example 11 (C). The permeability of these films to 0.5M PEG (M.W. 1500) was examined (as in Example 6) before and after the films were tested with solutions of 4N HCl and 4N NaOH.

Typical results of these tests are summarized in Table IV. Note: The concentration of the PEG in the water side after 24 hours was taken to be 1.00. All other concentration of the PEG are related to this number.

TABLE IV

| Test | before tested | after 4N HCl | after 4N NaOH |
|---|---|---|---|
| Conc. | 1.00 | 0.56 | 0.22 |

This example shows that after porogen decomposition, permeabilities may be further modified by reactions of the reactive groups retained in association with the permeation sites.

EXAMPLE 11 (e)

Films were prepared from 3% PVC in THF+0.3% CYCOHEXANONE, 0.6% or 1.5% of α-Lau and MSA as the catalyst as in Example 2.

After exhibiting permeability to 4N HCl the permeability of these films was tested towards 0.5M PEG (M.W. 300) and 0.5M tetrabutyl ammonium hydroxide (TBAH). The diameter of those two molecules was calculated to be both about 9A (the diameter of the PEG molecule was calculated as if the molecule appeared in its globular form).

The examination of permeability of the films to PEG and TBAH is described in Example 6.

The results show that molecules similar in diameter are separable due to their chemical reactivity towards the reactive groups on the surface of the pore.

EXAMPLE 12

Films were prepared in the method described in Comparative Example A from a solution of 3% PVC in THF+0.3% CYCLOHEXANONE, containing also Benzoyl Peroxide as the porogen.

Parts of those films were irradiated, while being attached to the glass with a U.V. lamp for two hours. The other parts of the films were not irradiated at all.

The I.R. Spectra of the films showed that those parts which were not irradiated had the characteristic lines of the peroxide, whereas those parts which were irradiated showed characteristic lines of both the peroxide and the benzoic acid.

Permeability of those films towards 4N HCl and 4N NaOH was examined and some of the typical results are summarized in Table V.

TABLE V

|  | ←— 4N HCl —→ | ←— 4N NaOh —→ | | | |
|---|---|---|---|---|---|
| % Benz. Perox. | 0.5 | 0.5 | 1.0 | 1.0 | | |
| irr (+) not irr (−) | − | + | − | + | − | + |
| PH  0 hours | 5.62 | 5.49 | 6.80 | 6.50 | 5.72 | 7.09 |
| 24 hours | 3.49 | 2.63 | 3.80 | 1.04 | 9.17 | 11.81 |

EXAMPLE 13

Films were made from a solution of 3% PVC in THF+0.3% CYCLOHEXNONE and TBO or Di-tert-butyl malonate (DTBM) as porogens, containing also MSA as the catalyst as in Example 2.

These films were tested by a sequence of 4N HCl and 4N NaOH. Table VI summerizes the results of two films.

TABLE VI

| | Film A: 0.3% TBO | | | | | | | | | |
|---|---|---|---|---|---|---|---|---|---|---|
| TEST | HCl | NaOH | HCl | NaOH | HCl | NaOH | HCl | NaOH | HCl | HCl |
| PH  0 hours | 4.37 | 6.70 | 5.46 | 5.23 | 5.78 | 6.15 | 5.36 | 6.21 | 6.00 | 4.77 |
| 24 hours | 4.37 | 12.32 | 5.46 | 12.52 | 5.78 | 12.80 | 2.77 | 12.82 | 2.50 | 1.37 |

| | Film B: 0.3% DTBM | | | | | | | |
|---|---|---|---|---|---|---|---|---|
| TEST | HCl | NaOH | HCl | NaOH | HCl | NaOH | HCl | NaOH |
| PH  0 hours | 5.60 | 5.71 | 5.69 | 6.40 | 5.48 | 4.50 | 5.30 | 6.10 |
| 24 hours | 2.97 | 12.73 | 0.84 | 13.05 | 1.20 | 12.68 | 1.05 | 12.65 |

The results shows that films which are impermeable to 4N HCl in the first stage(s) are "opened" and stabilize after a sequence of treatments (tests) with NaOH.

EXAMPLE 14

Films were cast from a solution comprising of polyvinyl acetate and polytert-butyl methyl methacrylate (PTBMM) as a porogen in THF+cyclohexanone as solvent.

Some of the films contained also MSA as the catalyst and all of the films were held at 45° C. for 24 hours.

The formation and permeability tests of these films were conducted using the same methods as described in Comparative Example A.

Permeability of HCl in those films was examined and it was found that those films, which contained MSA were permeable to HCl, whereas those which didn't contain MSA were impermeable to HCl. Thus, polymers may provide for permeability when they contain decomposable moieties.

EXAMPLE 15

Films were cast from a solution of 3% Polysulfone in THF+0.3% CYCLOHEXANONE containing also Tert-butyl oleate (TBO) as the porogen and MSA as the catalyst as in Example 2.

A sequence of permeability tests of those films to HCl, NaOH and PEG (M.W. 200) was done. Every test was continued 24–48 hours and the films were washed by distilled water for 24 hours before each test.

The results of one of those experiments are summarized in Table VII.

TABLE VII

| No. of Tests in seq. | 1 | 2 | 3 | 4 | 5 | 6 |
|---|---|---|---|---|---|---|
| Permeability of | 4NHCl | 4NNaOH | 4NHCl | 4NNaOh | 4NHCl | 0.5 M PEG200 |
| PER/IMP | IMP | PER | PER | PER | PER | IMP |

EXAMPLE 16

Films were prepared from a solution of 3% PVC in THF+0.3% CYCLOHEXANONE containing also 0.3% DTBDD and MSA as in Example 2.

A sequence of permeability tests towards 4N HCl and 4N NaOH were done and the results are summerized in Table VIII.

TABLE VIII

| Test | (4N)HCl | (4N)NaOH | (4N)HCl | (4N)NaOH | (4N)HCl | (4N)NaOH | (4N)HCl | (4N)NaOH | (4N)HCl | (4N)NaOH |
|---|---|---|---|---|---|---|---|---|---|---|
| PH |  |  |  |  |  |  |  |  |  |  |
| 0 hours | 5.05 | 5.53 | 5.53 | 6.38 | 5.41 | 4.84 | 5.16 | 6.36 | 5.44 | 5.48 |
| 24 hours | 5.05 | 10.02 | 5.53 | 11.36 | 5.41 | 11.00 | 5.00 | 11.36 | 5.44 | 11.63 |

It is noted that in contradistinction to the results obtained in Example 8 hereinbefore films more permeable to NaOH than to HCl can be produced by changing porogen concentration in the film forming solution resulting in variations in pore size and in the extent of chemical reactions that take place within the pores.

From the foregoing description, it will be evident to those skilled in the art that the invention is not limited to the details of the foregoing illustrative embodiments and examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come with the meaning and range of equivalency of the claims are therefore intended to be embraced therein.

I claim:

1. In a method for producing permeable polymeric membranes by removal of substances contained in a polymeric mass resulting in the formation of pores, the improvement comprising providing a single phase thermoplastic polymeric mass consisting essentially of a polymeric backbone and having either (a) pendant groups having decomposable molecular units chemically bound to said polymeric backbone or (b) compounds having decomposable molecular units molecularly dispersed in said polymeric mass and inducing the decomposition of said molecular units into smaller, discrete molecular units which spontaneously leave the polymeric mass by diffusion without melting of the polymer mass and/or decomposition of said polymeric backbone.

2. A method for producing permeable polymeric membranes according to claim 1 wherein said polymeric mass consists of a selected polymer having molecular units contained in compounds molecularly dispersed therein said compounds being fully decomposable to form small discrete molecules which substantially all leave the polymeric mass by diffusion whereby a permeable membrane substantially consisting solely of the selected polymer is obtained.

3. A method for producing permeable polymeric membranes according to claim 1 wherein said decomposable molecular units are selected to decompose so that there remains at the sites of decomposition and after diffusion of said decomposed molecular units, chemically active groups.

4. A method for producing permeable polymeric membranes according to claim 3 wherein said chemically active groups are charged.

5. A method for producing permeable polymeric membranes according to claim 3 wherein said chemically active groups contain bound metal atoms.

6. A method for producing permeable polymeric membranes according to claim 3 wherein said active groups contain cryptand moieties.

7. A method according to claim 1 wherein said polymeric mass is a thermoplastic polymer, and includes the steps of shaping said polymeric mass into a desired membrane form prior to the step of inducing the decomposition of said molecular units.

8. A method for producing permeable polymeric membranes according to claim 7 wherein said decomposition is induced while maintaining said membrane under tension.

9. A method for producing permeable polymeric membranes according to claim 7 wherein said shaped polymeric mass is subjected to cross-linking after shaping.

10. The method of claim 7, wherein said thermoplastic polymer is selected from the group consisting of polyvinyl chloride, polyvinyl acetate, polysulfone, polyethylene and nitrocellulose.

11. The method of claim 7, wherein said decomposible molecular units are selected from the group consisting of t-butyl p-toluenesolfonate, di-t-Buadipate, N-t-butoxy carbonyl α amine lauric acid t-butylester, benzoyl peroxide, di-t-butyl malonate, poly-t-butyl methul metacrylate, t-butyloleate, t-butyl acetate, t-butyl chloroacetate, t-butyl orthocarbone, t-butyl orthosilicate, t-butoxycarbonyl methyl amide, t-butoyxcarbonyl ethylene diamide, t-butoxycarbonyl ethanol amide, ethylene glycol ester of t-butyoxylcarbonyl and glyceryl ester of t-butoxycarbonyl.

12. The method of claim 7, wherein said decomposition is induced by immersion of said membrane in concentrated hydrochloric acid at room temperature to 40° C., for 20–48 hours.

13. The method of claim 7, wherein said decomposition is induced by incorporating an acid catalyst selected from the group consisting of methyl sulfonic acid and p-toluene sulfonic acid in said polymeric mass shaping polymeric mass into a desired membrane form, and holding said membrane in an oven at about 45° C. for 2 to 4 hours.

14. The method of claim 7, wherein said decomposition is induced by irradiation of said membrane with an ultraviolet lamp for 2 hours.

* * * * *